US012317787B2

(12) United States Patent
Johansson

(10) Patent No.: US 12,317,787 B2
(45) Date of Patent: Jun. 3, 2025

(54) HARVESTING HEAD FOR FORESTRY AND A METHOD FOR DETERMINING A THICKNESS OF A TREE TRUNK IN A HARVESTING HEAD FOR FORESTRY

(71) Applicant: SP Maskiner i Ljungby AB, Ljungby (SE)

(72) Inventor: Anders Johansson, Ryssby (SE)

(73) Assignee: SP Maskiner i Ljungby AB, Ljungby (SE)

( * ) Notice: Subject to any disclaimer, the term of this patent is extended or adjusted under 35 U.S.C. 154(b) by 331 days.

(21) Appl. No.: 17/756,549

(22) PCT Filed: Dec. 2, 2020

(86) PCT No.: PCT/EP2020/084293
§ 371 (c)(1),
(2) Date: May 26, 2022

(87) PCT Pub. No.: WO2021/110755
PCT Pub. Date: Jun. 10, 2021

(65) Prior Publication Data

US 2022/0408664 A1 Dec. 29, 2022

(30) Foreign Application Priority Data

Dec. 3, 2019 (SE) .................................... 1951383-7

(51) Int. Cl.
*A01G 23/095* (2006.01)
*A01G 3/08* (2006.01)

(52) U.S. Cl.
CPC ........... *A01G 23/095* (2013.01); *A01G 3/085* (2013.01)

(58) Field of Classification Search
CPC ..... A01G 23/00; A01G 23/083; A01G 23/095
See application file for complete search history.

(56) References Cited

U.S. PATENT DOCUMENTS 7,503,359 B2 * 3/2009 Lennartsson .......... G01B 11/10 144/34.1
9,357,717 B2 * 6/2016 Arvidsson ............ A01G 23/095
9,554,524 B2 * 1/2017 Swinyard ............. A01G 23/095

FOREIGN PATENT DOCUMENTS

EP 0 346 308 B1 8/1991
EP 2 265 894 B1 6/2018

(Continued)

OTHER PUBLICATIONS

Log Max, "Above and Beyond: 2018—Catalogue—English", as early as May 29, 2019, 44 pages.

(Continued)

*Primary Examiner* — Matthew Katcoff
(74) *Attorney, Agent, or Firm* — Christensen O'Connor Johnson Kindness PLLC

(57) ABSTRACT

The present invention relates to a method for determining a thickness of a tree trunk (17) in a harvesting head (1) for forestry, said harvesting head (1) comprising a tree trunk pressing device (3, 4, 7, 8), and a tree trunk surface follower (11, 11), wherein the tree trunk surface follower is a limbing member (11, 11'), and wherein the limbing member (11, 11') is curved, said method comprising pressing the tree trunk (17), with said tree trunk pressing device (3, 4, 7, 8), in a direction towards a reference surface (15) of the harvesting head (1) and determining a measured thickness (T) by measuring the position of the tree trunk pressing device (3, 4, 7, 8) and relating said position to said reference surface (15), said method further comprising the steps of determining a deviation (D) of the tree trunk (17) from said reference surface (15) by measuring a position of the tree trunk surface follower (11, 11') and relating said position of the tree trunk surface follower (11, 11') to said reference surface (15), and calculating a corrected thickness (Tc) of the tree trunk (17) based on said measured thickness (T) and said deviation (D), (Continued)

wherein determining the deviation (D) further comprises relating said position of the tree trunk surface follower (11, 11') to said measured thickness (T).

13 Claims, 7 Drawing Sheets

(56) References Cited

FOREIGN PATENT DOCUMENTS

| | | | |
|---|---|---|---|
| WO | 00/15026 | A1 | 3/2000 |
| WO | 2006/092469 | A1 | 9/2006 |
| WO | 2009/157864 | A1 | 12/2009 |
| WO | 2019/226088 | A1 | 11/2019 |

OTHER PUBLICATIONS

WayBack Machine snapshots: 5000D With 4 Point Measuring and Active Friction Control disclosed as early as Mar. 3, 2018, and 6000B 2018—Catalogue With Four Point Measuring and Active Friction disclosed as early as May 29, 2019, (best available copies), 3 pages.

"Documents confirming dating back to 2015" for Active Friction Control (best available copy), 1 page.

"Documents confirming dating back to 2015" for Four Point Measuring (best available copy), 1 page.

International Search Report and Written Opinion mailed Mar. 9, 2021, issued in corresponding International Application No. PCT/EP2020/084293, filed Dec. 2, 2020, 9 pages.

* cited by examiner 18
19
17
15
3
4
$T_2$
19
18
19
17
15
3
4
$T_1$
19

HARVESTING HEAD FOR FORESTRY AND A METHOD FOR DETERMINING A THICKNESS OF A TREE TRUNK IN A HARVESTING HEAD FOR FORESTRY

TECHNICAL FIELD OF THE INVENTION

The present invention relates to a harvesting head for forestry and a method of determining a thickness of a tree trunk in a harvesting head.

BACKGROUND OF THE INVENTION

Harvesting heads are used in forestry to cut down trees, limb them, cut the trunk into smaller pieces and while doing this also determine the size of the trees. The sizes that are determined are the length and thickness of the trees' trunks.

A harvesting head usually consists of a rigid frame to which there is attached a pair of front limbing knives, a pair of feeding rollers, a chain saw and sometimes one or two back limbing knives situated between the pair of feeding rollers and the chain saw.

A harvesting head functions as such that it grips a tree by its trunk close to the ground. It then cuts through the trunk and fells the tree. The tree is then fed through the harvesting head, which limbs the tree as it passes therethrough. After feeding through certain lengths of the tree the fed-through parts are cut off, after which the tree is continued to be fed through. When the tree's trunk becomes too thin, the tree is let go off.

The limbing knives, the feeding rollers as well as the chain saw are all pivotally movable. The chain saw such that it can move against the tree trunk and saw it through. The feeding rollers such that they can grip the tree trunk and feed it through the harvesting head by rolling. The limbing knives such that they can enclose the trunk and press it against a gliding surface of the harvesting head. A gliding surface is a surface on the harvesting head's frame against which a tree trunk glides when it is fed through the harvesting head.

The length of a tree trunk is measured continuously as a trunk is fed through the harvesting head. The thickness of a tree trunk is determined at several points with a certain length interval. The thickness and length of a tree trunk is used to calculate the volume of the harvested tree.

The thickness of a fed through tree trunk is typically determined by measuring the position of a limbing knife or a feeding roller and relating its position to the frame of the harvesting head, typically the gliding surface. Since the tree trunk is pressed against the frame by either a limbing knife or a feeding roller, the position of the limbing knife or feeding roller will be related to the thickness of the fed through trunk.

Although this method may have an acceptable accuracy for now, it is far from perfect and the determined thickness is too often wrong.

SUMMARY OF THE INVENTION

It is an object of the present disclosure to present a method for determining a thickness of a tree trunk in a harvesting head for forestry with increased accuracy. It is also an object of the present disclosure to present a harvesting head for forestry which can determine a thickness of a tree trunk with increased accuracy.

According to an aspect of the present disclosure there is provided a method for determining a thickness of a tree trunk in a harvesting head for forestry, said harvesting head comprising a tree trunk pressing device, and a tree trunk surface follower, wherein the tree trunk surface follower is a limbing member, and wherein the limbing member is curved, said method comprising pressing the tree trunk, with said tree trunk pressing device, in a direction towards a reference surface of the harvesting head and determining a measured thickness by measuring the position of the tree trunk pressing device and relating said position to said reference surface, said method further comprising the steps of determining a deviation of the tree trunk from said reference surface by measuring a position of the tree trunk surface follower and relating said position of the tree trunk surface follower to said reference surface, and calculating a corrected thickness of the tree trunk based on said measured thickness and said deviation, wherein determining the deviation further comprises relating said position of the tree trunk surface follower to said measured thickness. In this manner a thickness of a tree trunk can be determined which is corrected for any deviation of the tree trunk from the reference surface. The accuracy of the determined thickness will be much improved and thereby also the accuracy of the calculated volume of the harvested trees. By being able to adjust for a deviation of a tree trunk from a reference surface the tree trunk does no longer need to be pressed against the reference surface at all times, instead a deviation can be allowed. Thus, the pressing power of the tree trunk pressing device can be reduced and the friction of the tree against the harvesting head will be reduced as a result. This will lead to less power consumption and a faster limbing process in the harvesting head.

A tree trunk surface follower is a device which is arranged to follow the surface of a tree trunk held in a harvesting head, following the movement of the tree trunk surface while the tree trunk is fed through the harvesting head. The tree trunk surface follower may abut the tree trunk surface but does not need to. Ideally, the tree trunk surface follower is placed as close to the tree trunk pressing device as possible, in the feeding direction of the tree trunk, such that the deviation of the tree trunk is determined as close to the measured thickness as possible.

By determining the deviation by measuring the position of a tree trunk surface follower and relating its position to both the reference surface and the measured thickness, the dependence of the position of the tree trunk surface follower on the thickness of a tree trunk can be adjusted for.

In an alternative embodiment the method comprises determining a thickness of a tree trunk in a harvesting head for forestry, said harvesting head comprising a tree trunk pressing device, and a curved limbing member, said method comprising pressing the tree trunk, with said tree trunk pressing device, in a direction towards a reference surface of the harvesting head and determining a measured thickness by measuring the position of the tree trunk pressing device and relating said position to said reference surface, said method further comprising the steps of measuring a position of the limbing member, determining a deviation of the tree trunk from said reference surface as a function of said position of the limbing member, a curvature of the limbing member and said measured thickness, and calculating a corrected thickness of the tree trunk based on said measured thickness and said deviation.

According to one embodiment the harvesting head further comprises a proximity sensor, and measuring the position of the tree trunk surface follower is done with the proximity sensor.

According to one embodiment the proximity sensor is a magneto-inductive sensor.

According to one embodiment of the disclosure the tree trunk surface follower is pressed against at least a portion of the half of the circumference of the tree trunk which is closest to the reference surface. In this manner the tree trunk surface follower follows the position of the tree trunk's surface, following the part of the tree trunk which is closest to the reference surface. This assures that the position of the tree trunk surface follower will be related to the deviation of the tree trunk from the reference surface.

According to another aspect of the present disclosure there is provided a method for determining a volume of a tree trunk in a harvesting head by determining a length and several thicknesses of the tree trunk. The determined thicknesses being spaced at a certain length interval. The volume being calculated based on the determined length and thicknesses. The thicknesses being determined according to the previously disclosed method. In this manner a more accurate volume of a tree trunk can be determined. The volume of the tree trunk will be adjusted for any inaccuracies coming from deviations from the reference surface of the tree trunk during volume determining.

According to another aspect of the present disclosure there is provided a harvesting head for forestry, comprising a thickness measuring arrangement for measuring a measured thickness of a tree trunk, said thickness measuring arrangement comprising a tree trunk pressing device, for pressing said tree trunk in a direction towards a reference surface of the harvesting head, and a first measuring sensor arranged to measure the position of said tree trunk pressing device relative to said reference surface, said harvesting head further comprising a deviation measuring arrangement, for measuring a deviation of said tree trunk from said reference surface, said deviation measuring arrangement comprising a tree trunk surface follower and a second measuring sensor arranged to measure the position of said tree trunk surface follower, wherein the tree trunk surface follower is a limbing member, and wherein the second measuring sensor is a proximity sensor. An advantage of this embodiment is that it can determine a thickness of a tree trunk which is corrected for a deviation of the tree trunk from the reference surface.

According to one embodiment the second measuring sensor is a magneto-inductive measuring sensor.

According to one embodiment the limbing member is arranged on a front side of a front plate of the harvesting head, and wherein the second measuring sensor is arranged on a back side of the front plate, the back side being opposite to the front side According to one embodiment the second measuring sensor comprises a first portion and a second portion, wherein the first portion is arranged on the front plate and the second portion is arranged on the limbing member.

According to one embodiment the front plate comprises a slit extending through the front plate from the front side to the back side, wherein the first portion of the second measuring sensor is arranged on the back side of the front plate, and the second portion of the second measuring sensor is arranged in the slit.

In another embodiment of the present disclosure the tree trunk surface follower is arranged to follow at least a portion of the half of the circumference of the tree trunk which is closest to the reference surface. This embodiment has the advantage of assuring that the tree trunk surface follower follows the position of the tree trunk surface, following the part of the tree trunk which is closest to the reference surface, which in its turn assures that the position of the tree trunk surface follower is related to the deviation of the tree trunk from the reference surface.

The tree trunk surface follower may be pressed towards the tree trunk by a compression spring, a torsion spring or a hydraulic piston.

The tree trunk pressing device may comprise at least one limbing knife.

The tree trunk surface follower may be pivotally coupled to the harvesting head.

The tree trunk surface follower may be linearly guided.

The second measuring sensor may be a contact free linear sensor.

These and other aspects of the invention will be apparent from and elucidated with reference to the claims and the embodiments described hereinafter.

DETAILED DESCRIPTION OF THE PREFERRED EMBODIMENTS OF THE INVENTION

Figure 1A:
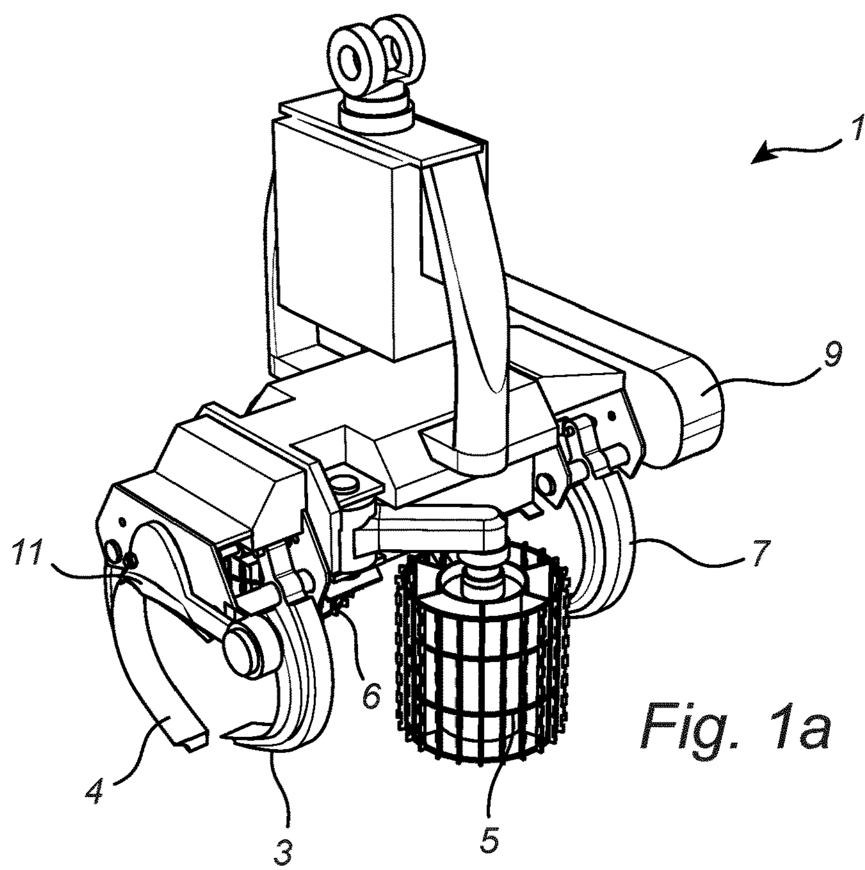
FIG. 1*a* is a perspective view and illustrates a harvesting head for forestry.
Figure 1B:
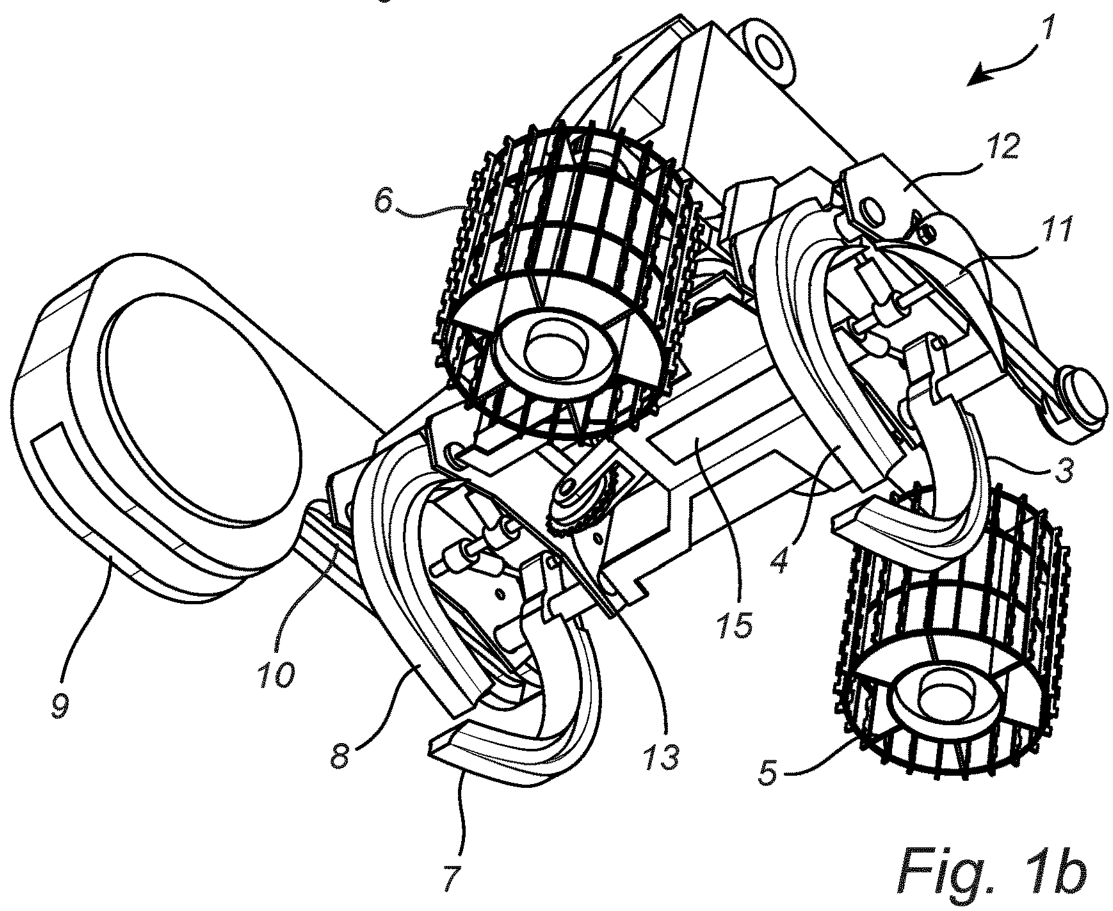
FIG. 1*b* is a perspective view from below illustrating the same harvesting head as in FIG. 1*a*.

In FIG. 1*a* and FIG. 1*b* a harvesting head 1 for forestry is shown. The harvesting head 1 comprises a tree trunk pressing device, in this case a pair of front limbing knives 3, 4, a tree trunk surface follower, in this case a limbing member 11, and a reference surface, in this case a gliding surface 15. The harvesting head 1 further comprises a pair of feeding rollers 5, 6, a pair of back limbing knives 7, 8, a chain saw 10 and a length measuring wheel 13.

Figure 2:
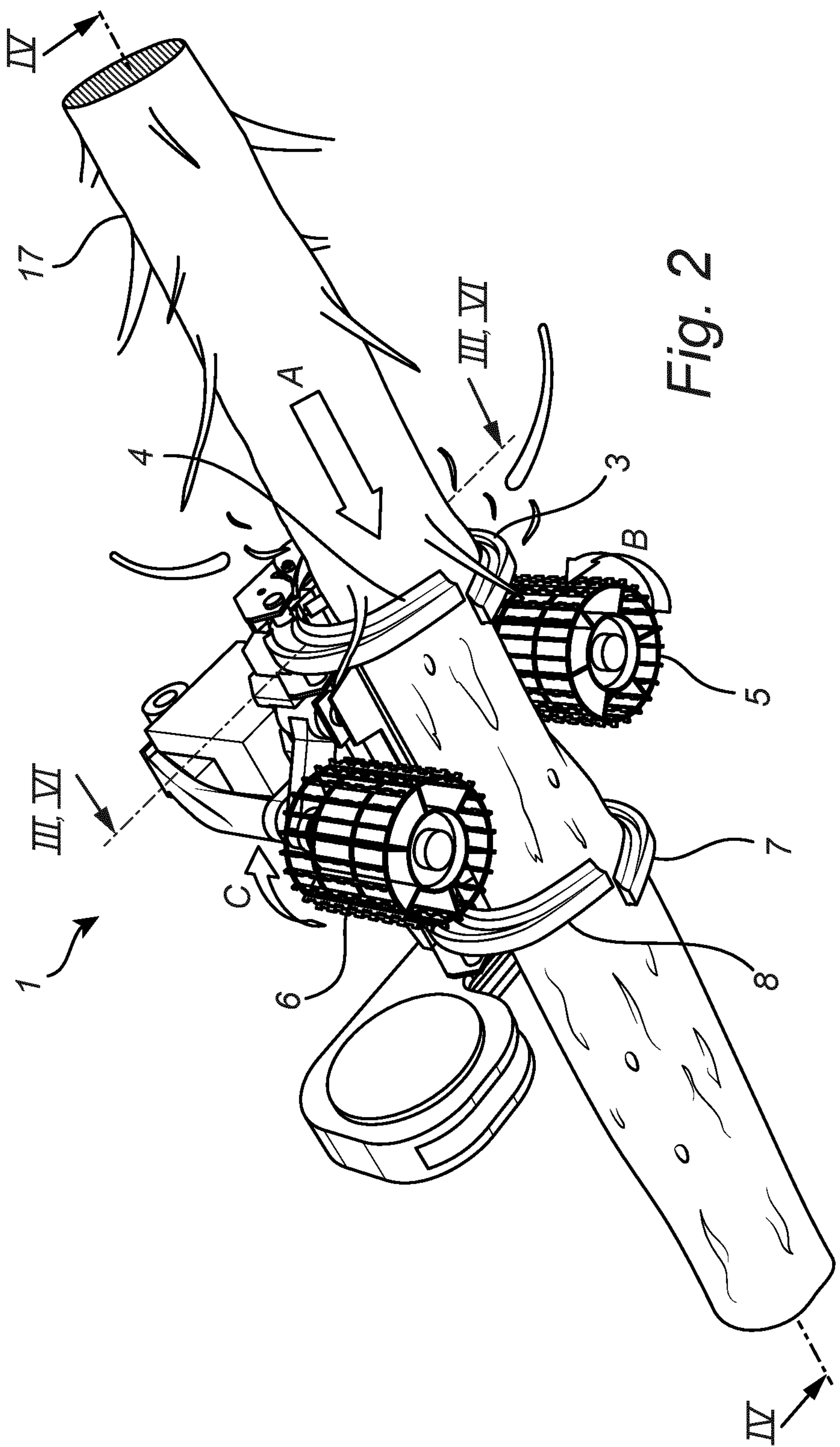
FIG. 2 is a perspective view from below illustrating the same harvesting head as in FIGS. 1*a* and 1*b* holding a tree trunk and feeding it through itself.

In FIG. 2 the same harvesting head 1 is shown while holding a tree trunk 17 and feeding it through itself. The feeding rollers 5, 6 are used to grip a tree trunk 17 and feed it through the harvesting head 1. The rollers 5, 6 are pivotally movable such that they can move towards and away from each other. By moving towards each other they can grip a tree trunk 17 between them. By spinning the rollers 5 and 6 in directions B and C respectively, a gripped tree trunk 17 will be moved through the harvesting head 1 in a feeding direction A. The limbing knives 3, 4 are pivotally movable in a plane perpendicular to the feeding direction A of the tree trunk 17 and are used to enclose a tree trunk 17 and press it in a direction towards the gliding surface 15. The front limbing knives 3, 4 are used to limb a tree trunk 17 as well as to determine a thickness of it. The back limbing knives 7, 8 are also pivotally movable in a plane perpendicular to the feeding direction A of the tree trunk 17 and used to enclose a tree trunk 17 and press it in a direction towards the gliding surface 15. The limbing knives 3, 4, 7, 8 have the form of curved knives with the sharp end on the front side. An enclosed tree trunk 17 will have its limbs cut off by the limbing knives 3, 4, 7, 8 when fed through the harvesting head 1 in feeding direction A. The chain saw 10 is used to cut off limbed pieces of a tree trunk 17. The chain saw 10 is held inside a cover 9 and is pivotally movable in a plane perpendicular to the feeding direction A of the tree trunk 17. The tree trunk 17 is cut by moving the chain saw 10 through it.

The limbing member 11 is arranged on a front plate 12 of the harvesting head. The front plate 12 is a plate arranged on the front side of the harvesting head 1. The front side of the harvesting head 1 being the side of the harvesting head 1 facing towards the feeding direction A. The front plate 12 has a front side and a back side. The back side of the front plate 12 is the side facing along the feeding direction A. The front side is arranged to face a portion of a tree trunk 17 with limbs. The back side is arranged to face a delimbed portion of a tree trunk 17.

The limbing member 11 is curved. By this is meant that a portion of the limbing member 11 arranged to be closest to a tree trunk 17 fed through the harvesting head has a curved shape. This could be a sharp edge, which is comprised by the limbing member, configured to delimb a portion of the circumference of the tree trunk 17. A curved shape could be a continuous curve. A curved shape could be a combination of two or more straight lines or surfaces arranged at an angle relative each other. A curved shape could be a combination of a continuous curve and one or more straight lines or surfaces arranged at an angle relative each other. The limbing member is curved such that it is concave towards the tree trunk.

Figure 3:
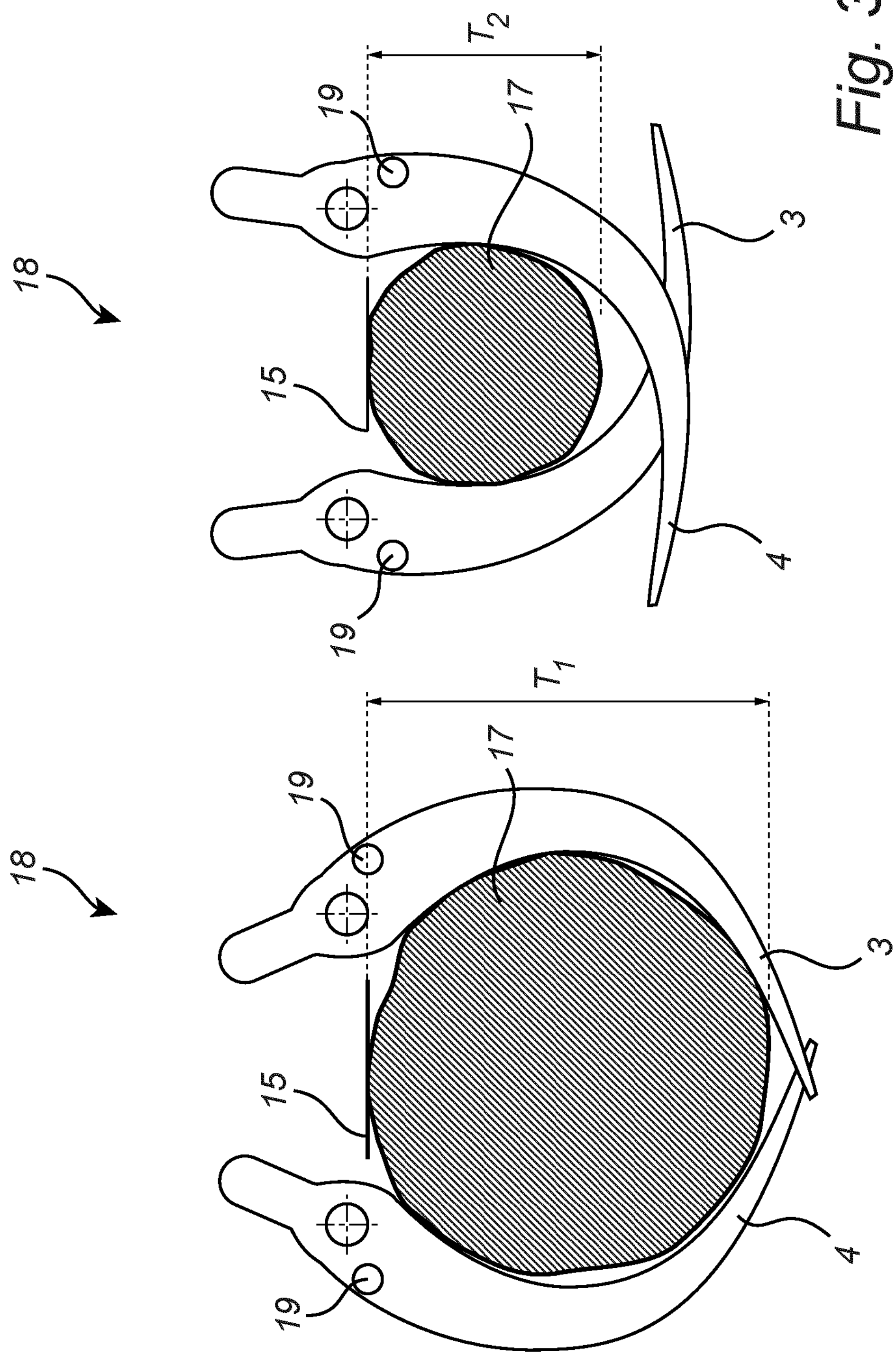
FIG. 3 is a cross sectional view, along III in FIG. 2, illustrating how tree trunks of different thicknesses is held by the harvesting head.

FIG. 3 shows how the thickness of a tree trunk 17 affects the position of the front limbing knives 3, 4, which press the tree trunk towards the gliding surface 15. A tree trunk 17 with a larger thickness $T_1$ will mean that the limbing knives 3, 4 are positioned differently than if the tree trunk 17 had a smaller thickness $T_2$. The position of the limbing knives 3, 4 relative to the gliding surface 15 is thus related to the thickness of a tree trunk 17. A measured thickness of an enclosed tree trunk 17 can therefore be determined by measuring the position of the limbing knives 3, 4 and relating the position of the limbing knives 3, 4 to the gliding surface 15. The thickness determined being the thickness $T_1$, $T_2$ of the tree trunk 17 in a direction perpendicular to the gliding surface 15. In the disclosed embodiment the thickness $T_1$, $T_2$ is determined by a thickness determining arrangement 18, which comprises the pair of front limbing knives 3, 4 and rotary encoders 19. The rotary encoders 19 are arranged to measure the angular position of the front limbing knives 3, 4. The angular position of the limbing knives 3, 4 is related to the gliding surface 15, and thereby a thickness of a tree trunk 17, through a conversion table which relates different angular positions of the front limbing knives 3, 4 to different thicknesses. By measuring the angular position of the front limbing knives 3, 4 a measured thickness $T_1$, $T_2$ of a tree trunk 17 is thus obtained.

When determining the thickness of a tree trunk 17 using the position of the limbing knives 3, 4, they are assumed to press the tree trunk 17 against the gliding surface 15 such that the tree trunk 17 abuts it. By assuming this, the position of the limbing knives 3, 4, in relation to the gliding surface 15, will be directly related to the thickness of a tree trunk 17. However, if the tree trunk 17 for some reason does not abut the gliding surface 15 the measured thickness $T_1$, $T_2$ will be wrong. A common cause of measurement error is a deviation of the tree trunk 17 from the gliding surface 15. Such a deviation may occur if the tree trunk 17 is curved or if its surface is uneven, for example from a poorly cut off limb.

Figure 4:
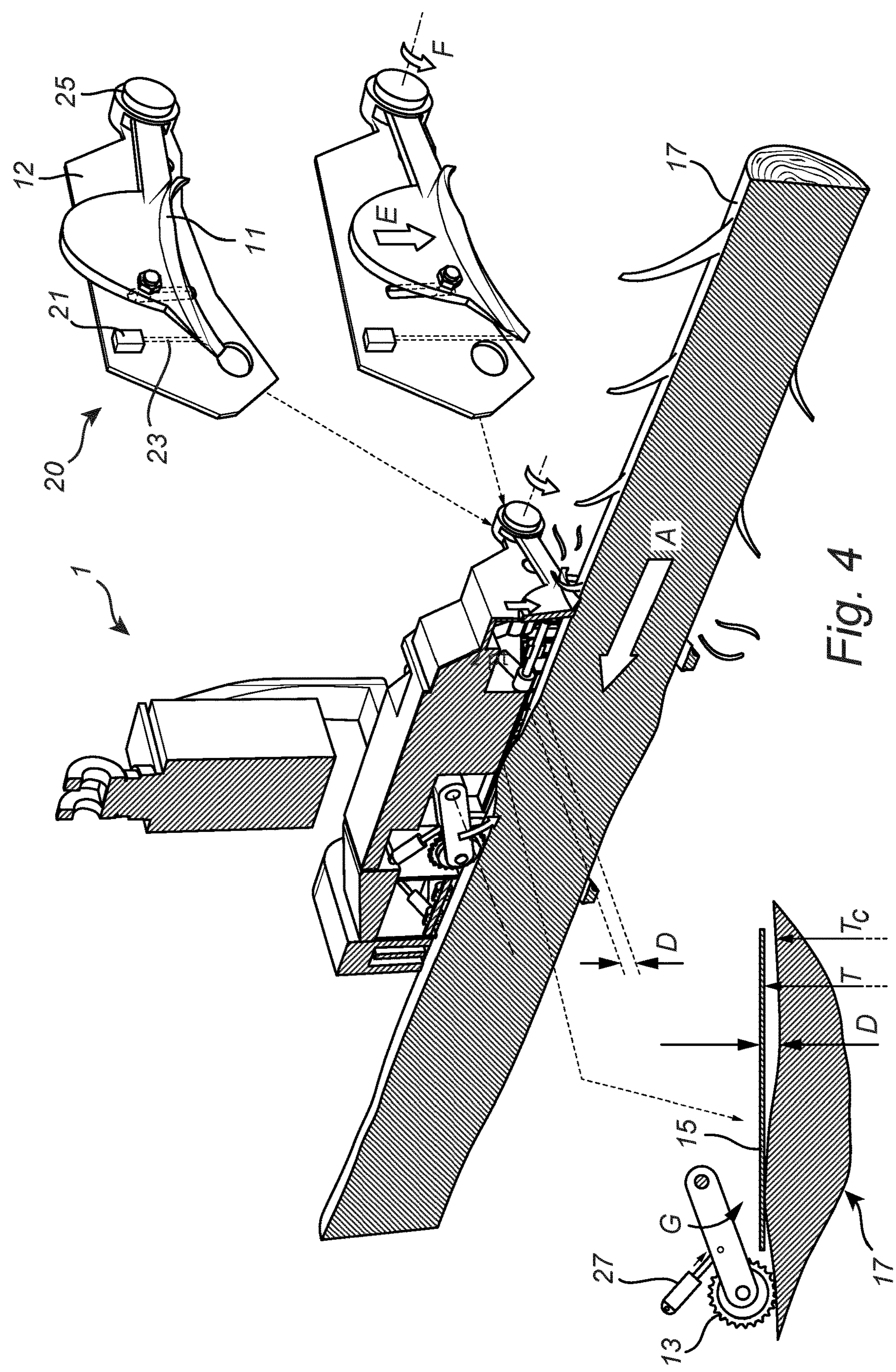
FIG. 4 is a cross sectional view, along IV in FIG. 2, illustrating a tree trunk being fed through the harvesting head.

FIG. 4 shows a cross sectional view of the harvesting head 1 holding a tree trunk 17 from FIG. 2. In this figure it can clearly be seen that the tree trunk 17 has an uneven surface. This unevenness has produced a deviation D of the tree trunk 17 from the gliding surface 15. This deviation D is what differs a measured thickness T from a corrected thickness $T_c$. The corrected thickness $T_c$ being the measured thickness T corrected for the deviation D. The deviation is determined by a deviation measuring arrangement 20, which comprises the limbing member 11, a linear contact sensor 21, a rotational joint 25 and a torsion spring situated in the rotational joint 25. The limbing member 11 is pivotally coupled to the harvesting head 1 by rotational joint 25. The torsion spring presses the limbing member 11 towards the tree trunk 17 in a direction E by rotating the limbing member 11 in direction F. The linear contact sensor 21 is mechanically coupled to the limbing member 11 by connection 23. The linear contact sensor 21 measures the position of the limbing member 11. By measuring the position of the limbing member 11 it is possible to measure the deviation D. Since the limbing member 11 follows the surface of the tree trunk 17 its position can be related to the position of the surface which it follows. If the surface which the tree trunk surface follower follows is on the half of the circumference of the tree trunk 17 closest to the gliding surface 15, i.e. the same side which abuts or deviates from the gliding surface 15, the position of the limbing member 11 can be directly related to the deviation D of the tree trunk 17 from the gliding surface 15. The position of the limbing member 11 is related to the gliding surface 15, and thereby a deviation D of a tree trunk 17 from the gliding surface 15, through a conversion table which relates different positions of the limbing member 11 to different deviations D.

The deviation D is measured at a distance, along the feeding direction A of the tree trunk 17, from where the measured thickness T is measured. The smaller this distance is the better the measured deviation D will correspond to the deviation of the tree trunk 17 at the point where the measured thickness T is measured. The distance between where the measured deviation D and the measured thickness T is measured is preferably less than 10 cm.

In FIG. 4 it is also shown that the length measuring wheel 13 is pivotally coupled to the harvesting head 1 such that it moves in direction G, when pressed towards the surface of the tree trunk 17. The length measuring wheel 13 is pressed towards the surface of the tree trunk 17 by means of a hydraulic cylinder 27.

Figure 5A:
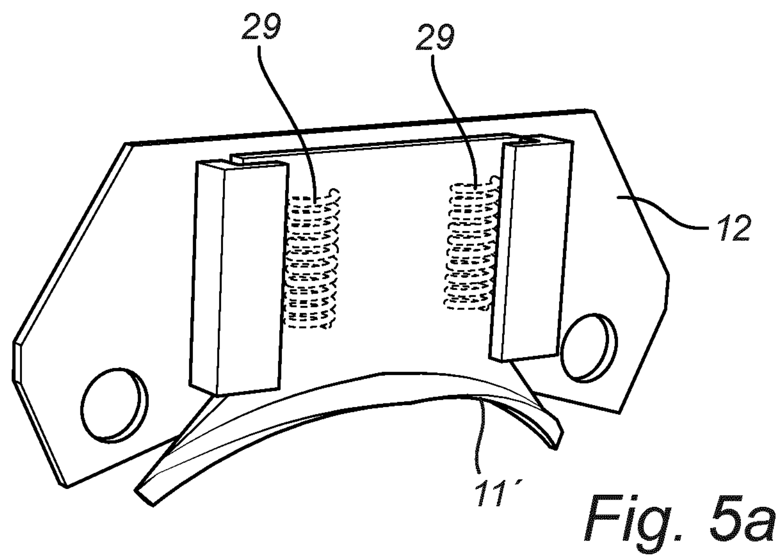
FIG. 5*a* is a perspective view illustrating an alternative limbing member, showing it in a retracted state
Figure 5B:
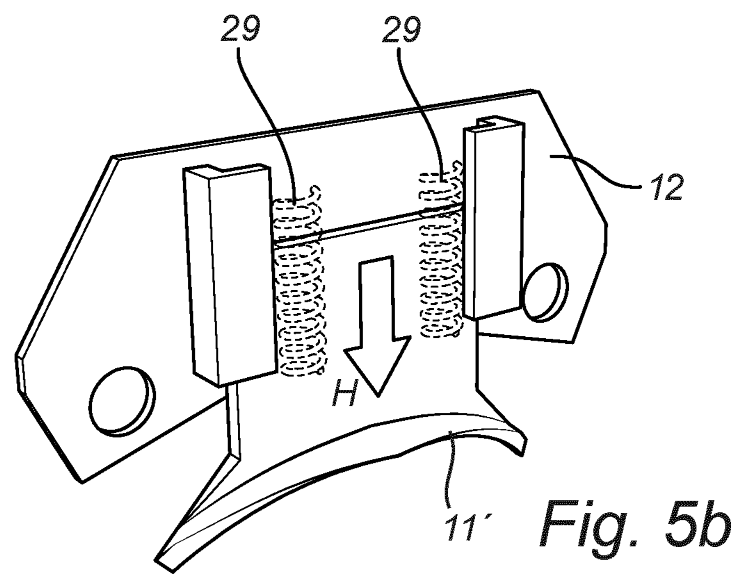
FIG. 5*b* is a perspective view illustrating the same limbing member as in FIG. 5*a*, showing it in a protracted state.

FIGS. 5*a* and 5*b* show an alternative limbing member 11' to the one shown in FIGS. 1 through 4. The limbing member 11' is linearly guided and pressed towards the tree trunk 17 in direction H by compression springs 29. The alternative limbing member's 11' position relative to the gliding surface 15 may be measured by a linear contact sensor mechanically coupled to the limbing member 11' or by a contact free linear sensor.

Figure 6:
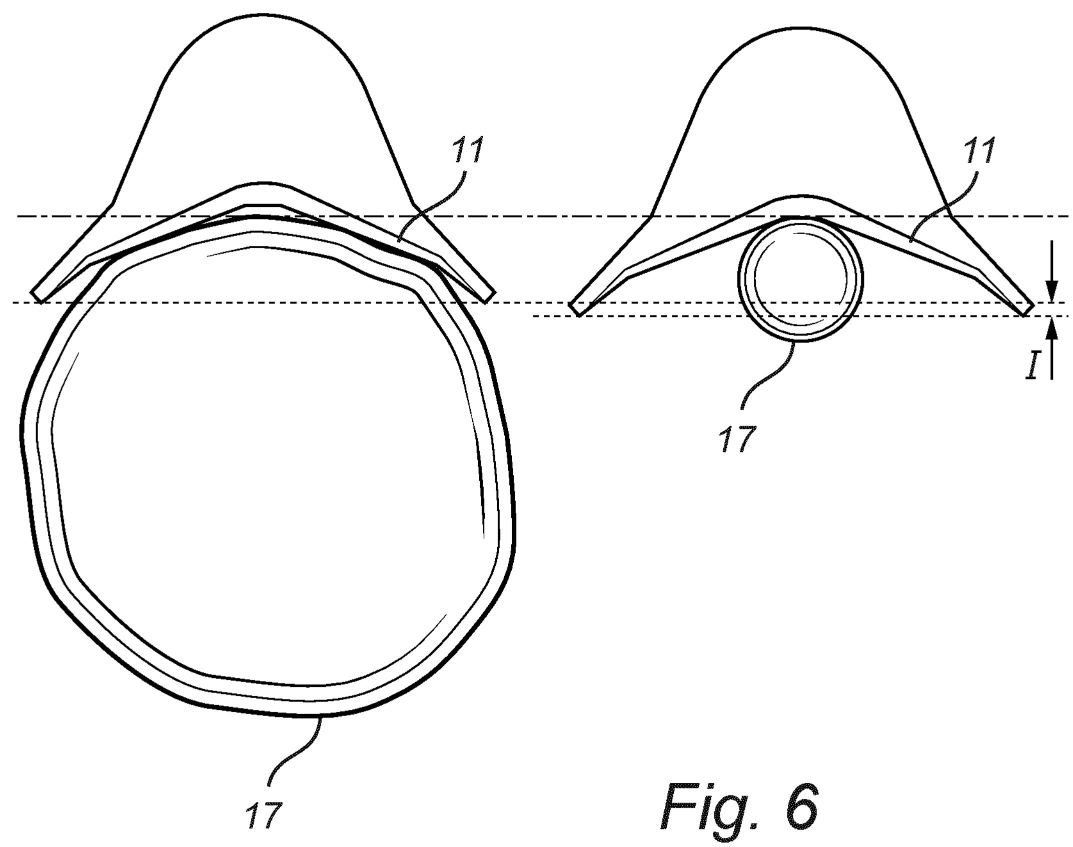
FIG. 6 is a cross sectional view, along VI in FIG. 2, illustrating how tree trunks of different thicknesses affect the position of a limbing member.

FIG. 6 shows how the position of a limbing member 11 is affected by the thickness of a tree trunk 17 abutting it. Compared to a thinner tree trunk 17, a thicker tree trunk 17 will shift the position of a limbing member 11 away from the tree trunk 17. This is because a thicker tree trunk 17 will not abut the limbing member 11 at the same points of the limbing member 11 as a thinner tree trunk 17 will, shifting the limbing member's 11 position by a distance I. When measuring the position of the limbing member 11, and thus the deviation D of the tree trunk 17 from the gliding surface 15, the position of the limbing member 11 may be assumed to only depend on the position of the tree trunk 17. Since this is not true, the position of the limbing member 11 also depending on the thickness of the tree trunk 17, an error may be present when determining a deviation D. By also taking into account the relationship between the thickness of the tree trunk 17 and the position of the limbing member 11, a more correct deviation D can be obtained. When determining the deviation D of the tree trunk 17, the position of the limbing member 11 can then be related to the gliding surface 15, and thereby a deviation D of a tree trunk 17 from the gliding surface 15, through a conversion table which relates different positions of the limbing member 11 and different measured thicknesses T of the tree trunk 17 to different deviations D. Thus determining the deviation D may further comprise relating the position of the limbing member 11 to the measured thickness of the tree trunk 17.

In further detail, determining the deviation D of the tree trunk 17 from said reference surface 15 may be done as a function of said position of the limbing member 11, a curvature of the limbing member 11 and the measured thickness (T).

Figure 7:
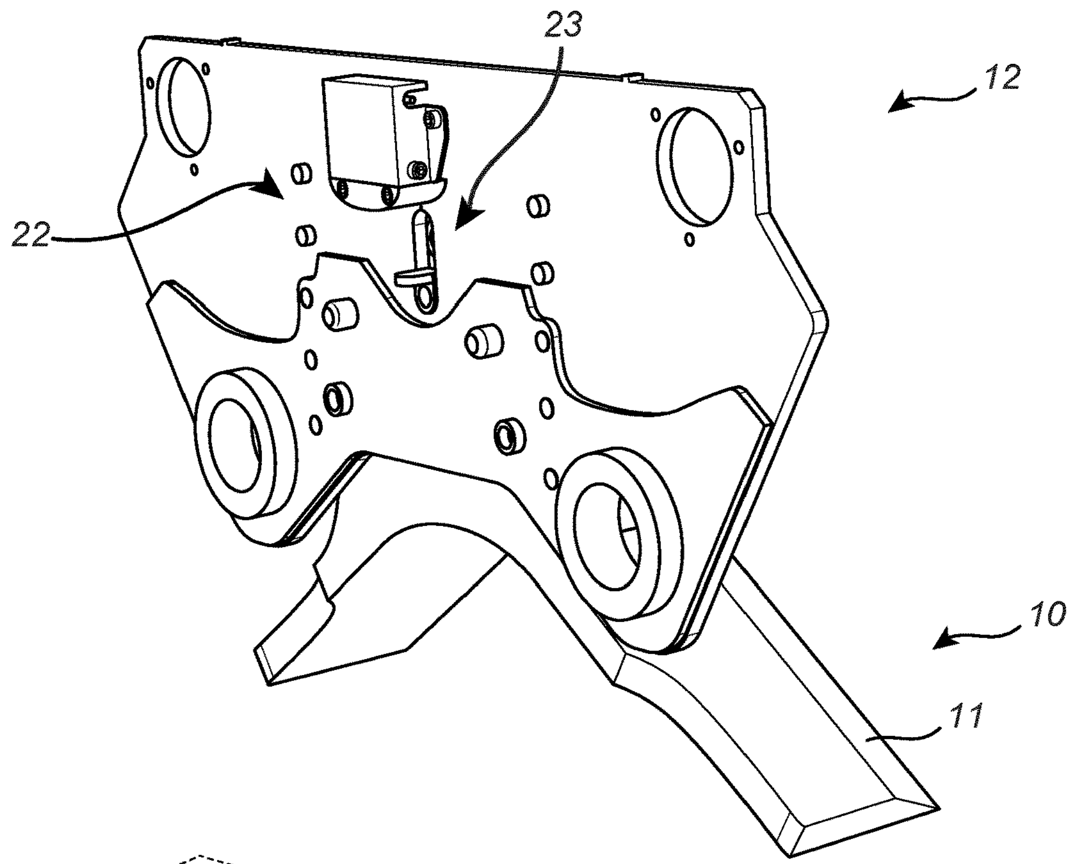
FIG. 7 is a perspective view of the back side of a front plate of a harvesting head.

FIG. 7 shows the back side of a front plate 12 of a harvesting head 1. A limbing member 11 is arranged on the front side of the front plate 12. A sensor 22 is arranged on the back side of front plate 12. The back side being opposite of the front side. The sensor 22 is a proximity sensor, a magneto inductive sensor. The sensor 22 is arranged to measure the position of the limbing member 11.

The sensor 22 comprises a first portion 22*a* and a second portion 22*b*. The first portion 22*a* is arranged on the front plate 12, on the back side of the front plate. The second portion 22*b* is arranged on the limbing member 11.

The front plate 12 comprises a slit 23. The slit 23 extends through the front plate 12 form the front side to the back side. The second portion of the sensor 22*b* is arranged in the slit 23.

Figure 8:
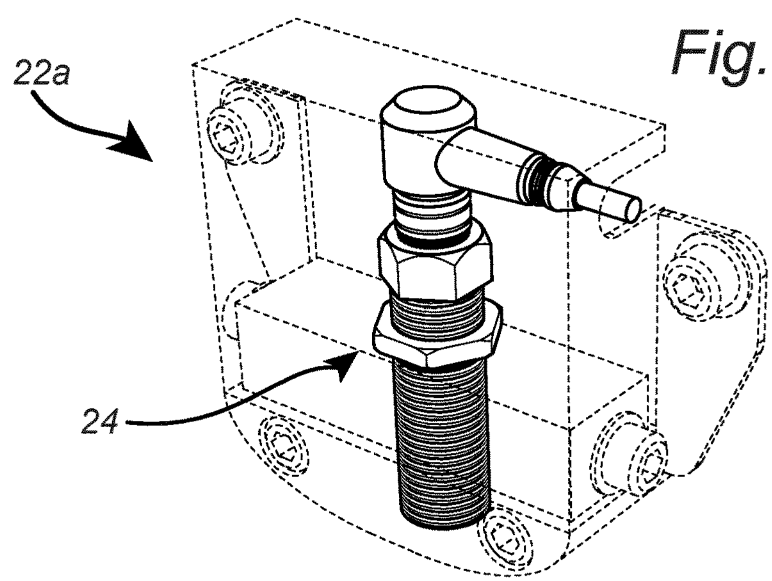
FIG. 8 is an enlarged perspective view a sensor arranged on the front plate of FIG. 7.
Figure 8:
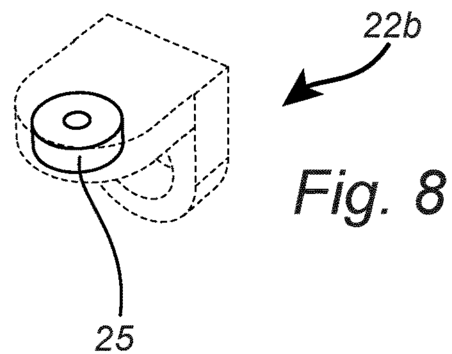

FIG. 8 shows the sensor 22 of FIG. 7. The first portion of the sensor 22*a* comprises a sensing element 24. The second portion of the sensor 22*b* comprises a target 25. The target 25 is in the form of a magnet. The sensing element 24 is configured to sense the presence of the target 25. The sensor 22 is configured to output an analog signal linearly proportional to the distance between the sensing element 24 and the target 25. The first portion 22*a* has a casing surrounding the sensing element 24. The second portion 22*b* has a casing surrounding the target 25.

With reference to FIGS. 3, 4 and 6 a method according to the present disclosure will now be described.

A corrected thickness $T_c$ of the tree trunk 17 is determined by determining a measured thickness T and a deviation D of the tree trunk 17 and calculating a corrected thickness $T_c$ based on the deviation D and the measured thickness T.

The measured thickness T is determined by measuring the angular position of the front limbing knives 3, 4, with the rotary encoders 19, and relating the position of the front limbing knives 3, 4 to the gliding surface 15. The angular position of the front limbing knives 3, 4 being related to the gliding surface 15, and thereby a measured thickness T, through a conversion table which relates different angular positions of the front limbing knives 3, 4 to different thicknesses T of a tree trunk 17 held in the harvesting head 1.

The deviation D is determined by measuring the position of the limbing member 11, with linear contact sensor 21, and relating its position to the gliding surface 15. The position of the limbing member 11 being related to the gliding surface 15, and thereby a deviation D, through a conversion table which relates different positions of the limbing member 11 to different deviations D of a tree trunk 17 held in the harvesting head 1.

The corrected thickness $T_c$ is calculated by subtracting the deviation D from the measured thickness T.

It is realized by a person skilled in the art that features from various embodiments disclosed herein may be combined with one another in order to provide further alternative embodiments.

Instead of a pair of front limbing knives 3, 4, the tree trunk pressing device may be any other limbing knife 3, 4, 7, 8. It does not need to be a pair of limbing knives, it may be more than a pair or just one knife. It may also be one or several feed rollers 5, 6.

Instead of measuring the angular position of the front limbing knives 3, 4 with an angle sensor it is possible to linearly measure their position with a linear sensor. This linear sensor could be coupled to pistons controlling the position of the limbing knives 3, 4.

The tree trunk pressing device may be a device separate from a limbing knife. The tree trunk pressing device may be anything as long as it presses the tree trunk in a direction towards a reference surface. A tree trunk surface follower may instead of a limbing member 11, 11' be a measuring wheel 13.

The tree trunk surface follower may be a device separate from a limbing member or length measuring wheel.

A reference surface does not need to be a gliding surface, it could be a surface of any size, situated anywhere on the harvesting head as long as the tree trunk is pressed in a direction towards it and the position of a tree trunk pressing device and the position of a tree trunk surface follower is related to it.

It is possible to measure a thickness of a tree trunk 17 with the back limbing knives 7, 8 in the same manner as done with the front limbing knives 3, 4.

Several thicknesses of the tree trunk may be determined at several points on the tree trunk 17 as it is fed through the harvesting head 1, the points separated by a certain length interval, the interval may be 10 centimeters.

Instead of the linear contact sensor 21, mechanically coupled to the limbing member 11 by connection 23, it is possible to use a contact free linear sensor, which would not need the connection 23. It is also possible to use an angle sensor positioned inside joint 25, the angle sensor could be a rotary encoder or an analog angle sensor. If the tree trunk surface follower is a measuring wheel 13, its position relative to the gliding surface 15 could be measured by a linear contact sensor coupled to the measuring wheel 13. It could also be measured by a contact free linear sensor or by an angle sensor such as a rotary encoder or analog angle sensor.

A few alternatives to a tree trunk surface follower and devices pressing it towards a tree trunk surface has been disclosed. The devices can be combined with whichever tree trunk surface follower. For example, a measuring wheel could also be pressed towards the tree trunk surface by a compression spring or a torsion spring.

In the described method the deviation may also be determined by not only relating the position of the limbing member 11 to the gliding surface 15, but also by relating the position of the limbing member 11 to the measured thickness T of the tree trunk 17. The position of the limbing member 11 being related to the gliding surface 15, and thereby a deviation D, through a conversion table which relates different positions of the limbing member 11 as well as different measured thicknesses T to different deviations D of a tree trunk 17 held in the harvesting head 1.

Instead of utilising conversion tables to calculate a thickness or a deviation, it is also possible to calculate a thickness or a deviation directly during the measuring process.

The invention claimed is:

1. A method for determining a thickness of a tree trunk in a harvesting head for forestry, said harvesting head comprising a tree trunk pressing device, and a tree trunk surface follower, wherein the tree trunk surface follower is a limbing member, and wherein the limbing member is curved, said method comprising pressing the tree trunk, with said tree trunk pressing device, in a direction towards a reference surface of the harvesting head and determining a measured thickness by measuring the position of the tree trunk pressing device and relating said position to said reference surface, said method further comprising the steps of determining a deviation of the tree trunk from said reference surface by measuring a position of the tree trunk surface follower and relating said position of the tree trunk surface follower to said reference surface, and calculating a corrected thickness of the tree trunk based on said measured thickness and said deviation, wherein determining the deviation further comprises relating said position of the tree trunk surface follower to said measured thickness, and wherein determining the deviation of the tree trunk from said reference surface is achieved as a function of said position of the limbing member, a curvature of the limbing member and the measured thickness.

2. A method according to claim 1 wherein the harvesting head further comprises a proximity sensor, and measuring the position of the tree trunk surface follower is done with the proximity sensor.

3. A method according to claim 2, wherein the proximity sensor is a magneto-inductive sensor.

4. A method according to claim 1, comprising pressing said tree trunk surface follower against at least a portion of the half of the circumference of the tree trunk which is closest to said reference surface.

5. A harvesting head for forestry, comprising a thickness measuring arrangement for measuring a measured thickness of a tree trunk, said thickness measuring arrangement comprising a tree trunk pressing device, for pressing said tree trunk in a direction towards a reference surface of the harvesting head, and a first measuring sensor arranged to measure the position of said tree trunk pressing device relative to said reference surface, said harvesting head further comprising a deviation measuring arrangement, for measuring a deviation of said tree trunk from said reference surface, said deviation measuring arrangement comprising a tree trunk surface follower and a second measuring sensor arranged to measure the position of said tree trunk surface follower, wherein the tree trunk surface follower is a limbing member, wherein the second measuring sensor is a proximity sensor, wherein the limbing member is arranged on a front side of a front plate of the harvesting head, wherein the second measuring sensor is arranged on a back side of the front plate, the back side being opposite to the front side, wherein the second measuring sensor comprises a first portion and a second portion, and, wherein the first portion is arranged on the front plate and the second portion is arranged on the limbing member.

6. A harvesting head according to claim 5, wherein the second measuring sensor is a magneto-inductive measuring sensor.

7. A harvesting head for forestry, comprising:

a thickness measuring arrangement for measuring a measured thickness of a tree trunk, said thickness measuring arrangement comprising a tree trunk pressing device, for pressing said tree trunk in a direction towards a reference surface of the harvesting head, and a first measuring sensor arranged to measure the position of said tree trunk pressing device relative to said reference surface, said harvesting head further comprising a deviation measuring arrangement, for measuring a deviation of said tree trunk from said reference surface, said deviation measuring arrangement comprising a tree trunk surface follower and a second measuring sensor arranged to measure the position of said tree trunk surface follower, wherein the tree trunk surface follower is a limbing member, wherein the second measuring sensor is a proximity sensor, wherein the front plate comprises a slit extending through the front plate from the front side to the back side, wherein the first portion of the second measuring sensor is arranged on the back side of the front plate, and the second portion of the second measuring sensor extends through the slit.

8. A harvesting head according to claim 7, wherein said tree trunk surface follower is arranged to follow at least a portion of the half of the circumference of the tree trunk which is closest to the reference surface.

9. A harvesting head according to claim 5, wherein said deviation measuring arrangement comprises a torsion spring, a compression spring or a hydraulic piston.

10. A harvesting head according to claim 5, wherein said tree trunk pressing device comprises at least one limbing knife.

11. A harvesting head according to claim 5, wherein said tree trunk surface follower is linearly guided.

12. A harvesting head according to claim 5, wherein said tree trunk surface follower is pivotally coupled to the harvesting head.

13. A harvesting head according to claim 5, wherein said tree trunk surface follower is arranged to follow at least a portion of the half of the circumference of the tree trunk which is closest to the reference surface.

* * * * *